United States Patent
Weber et al.

(10) Patent No.: US 7,905,550 B2
(45) Date of Patent: Mar. 15, 2011

(54) STRUCTURAL ELEMENT FOR VEHICLE SEAT

(75) Inventors: Christoph Weber, Berlin (DE); Stefan Funk, Leichlingen (DE); Hüsseyin Kaya, Krefeld (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 12/266,358

(22) Filed: Nov. 6, 2008

(65) Prior Publication Data
US 2009/0121535 A1 May 14, 2009

(51) Int. Cl.
A47C 1/12 (2006.01)

(52) U.S. Cl. .................... 297/452.18; 297/452.1

(58) Field of Classification Search ............... 297/452.1, 297/452.18
See application file for complete search history.

(56) References Cited

U.S. PATENT DOCUMENTS

| | | | | |
|---|---|---|---|---|
| 3,832,003 A | * | 8/1974 | Horvat | 297/216.14 |
| 4,580,837 A | * | 4/1986 | Bayley | 297/362.12 |
| 4,595,238 A | * | 6/1986 | Goldner | 297/452.18 |
| 5,412,860 A | * | 5/1995 | Miyauchi et al. | 29/527.1 |
| 5,601,333 A | * | 2/1997 | Bostrom et al. | 297/218.5 |
| 5,718,478 A | * | 2/1998 | Allison | 297/344.1 |
| 5,904,407 A | * | 5/1999 | Larson et al. | 297/452.21 |
| 6,357,789 B1 | * | 3/2002 | Harada et al. | 280/730.2 |
| 6,578,911 B2 | * | 6/2003 | Harada et al. | 297/216.13 |
| 6,817,672 B2 | * | 11/2004 | Matsunuma | 297/452.18 |
| 6,869,145 B2 | * | 3/2005 | Matsunuma | 297/452.18 |
| 7,331,601 B2 | * | 2/2008 | Tracht | 280/730.2 |
| 7,341,275 B2 | * | 3/2008 | Miyake et al. | 280/730.2 |
| 7,677,669 B2 | * | 3/2010 | Blankart | 297/452.18 |
| 2001/0001221 A1 | * | 5/2001 | Okazaki et al. | 297/452.18 |
| 2005/0225133 A1 | * | 10/2005 | Aufrere et al. | 297/216.1 |

FOREIGN PATENT DOCUMENTS

| DE | 42 08 150 A1 | | 9/1993 |
|---|---|---|---|
| DE | 44 02 864 A1 | | 8/1995 |
| DE | 197 57 060 A1 | | 6/1999 |
| WO | WO 2006037486 A1 | * | 4/2006 |

* cited by examiner

*Primary Examiner* — David Dunn
*Assistant Examiner* — Erika Garrett
(74) *Attorney, Agent, or Firm* — Fletcher Yoder P.C.

(57) ABSTRACT

A vehicle seat includes a structural element of a backrest. A through-loading opening is provided in the element. The element includes a metal plate with a reinforcing plate secured to it. A channel in the element is provided in at least some of its circumference or periphery. The channel is hollow and a reinforcing profile is inserted into the channel.

17 Claims, 2 Drawing Sheets

STRUCTURAL ELEMENT FOR VEHICLE SEAT

CROSS REFERENCE TO RELATED APPLICATIONS

This application claims priority from and the benefit of PCT Application No. PCT/EP2007/002320, filed on Mar. 16, 2007; and German Patent No. DE 10 2006 038 244.7, filed on Aug. 16, 2006; and German Patent DE 10 2006022 015.3, filed on May 10, 2006; all entitled "Structural Element for a Vehicle Seat", which are herein incorporated by reference.

BACKGROUND

The invention relates to a structural element for a vehicle seat, in particular for a backrest segment, which is provided with a through-loading opening, of a backrest for the rear seat bench of a motor vehicle, said structural element comprising a sheet metal plate with a reinforcing plate placed onto it and reinforcing profiles.

A structural element of the type in question is known from the publication DE 44 02 864 A1. It comprises a first sheet metal plate deformed three-dimensionally by means of stamping, and a reinforcing plate which is recessed in the manner of a frame and is connected to the sheet metal plate. Furthermore, inserts which are stamped or bent from sheet metal and locally increase the strength of the structural element are arranged in regions of the structural element that are subject to a high degree of loading.

The increase in strength by means of a reinforcement of the previously known type no longer always satisfies the continuously increasing demands imposed on the rigidity of structural elements for vehicle seats.

The invention addresses the problem of improving the mechanical properties of a structural element of the type in question using simple means.

SUMMARY

The problem is solved according to the invention in that a channel of U-shaped design is formed in the structural element, at least in partial regions of its circumference, said channel being divided into at least one hollow chamber and at least one remaining channel by means of a reinforcing profile inserted into the channel.

The dependent claims relate to preferred embodiments of the invention.

DRAWINGS

Figure 1:
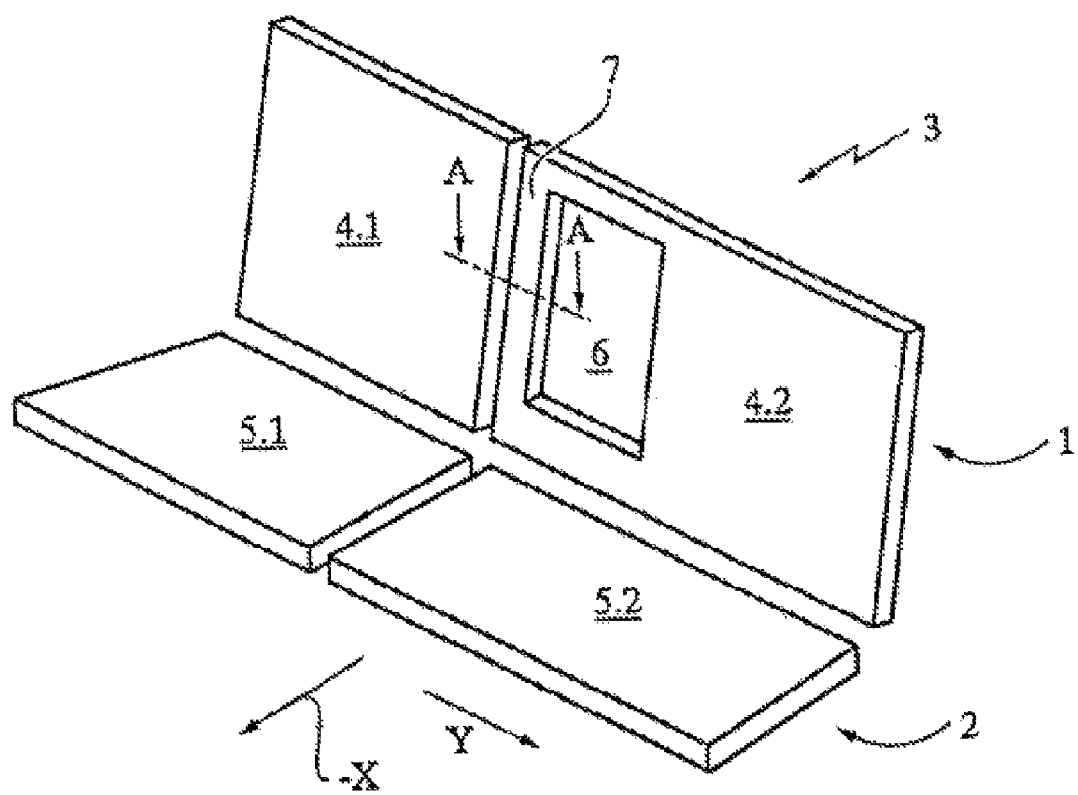
Figure 2:
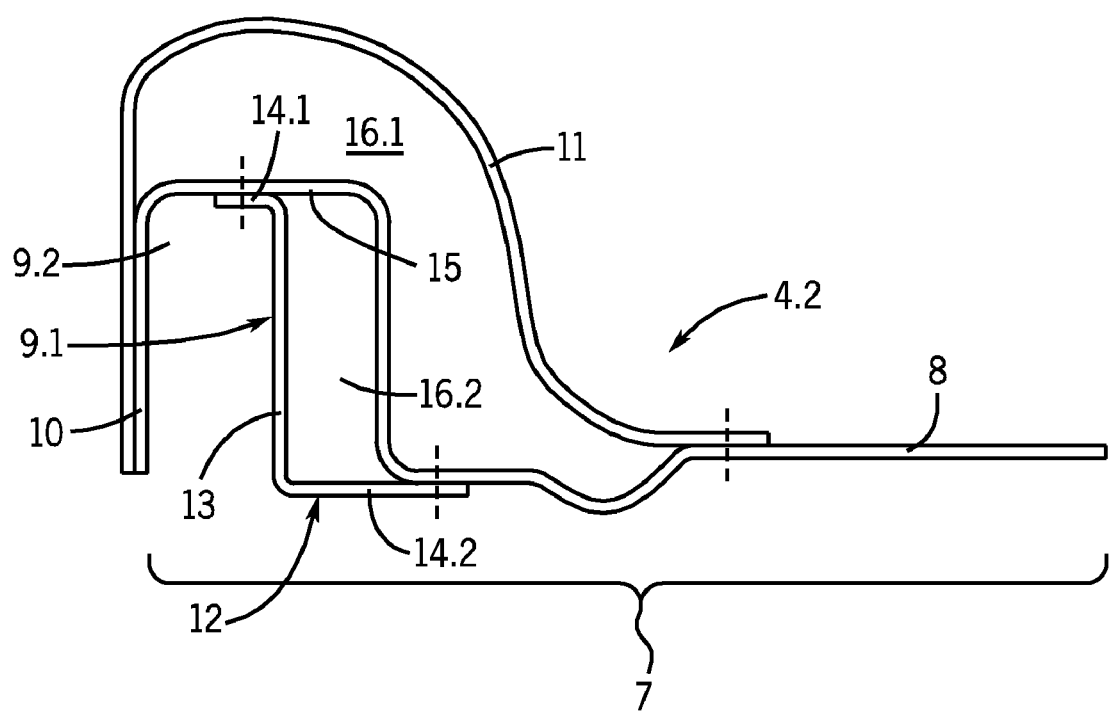

The figures represent an embodiment of the invention by way of example and schematically.
In the Figures:
FIG. 1 shows a perspective illustration of a rear seat bench equipped according to the invention,
FIG. 2 shows a section A-A through a structural element of the rear seat bench according to FIG. 1.

DETAILED DESCRIPTION

FIG. 1 shows schematically the structural elements of the backrest 1 and seat parts 2 of a rear seat bench 3, which structural elements are divided transversely with respect to the sitting direction (direction of travel—X) in a ratio of 40:60 into backrest segments 4.1, 4.2 and seat part segments 5.1, 5.2. This division enables partial regions of the rear seat bench 3 to be shifted from the use position shown into a loading position.

The 60% backrest segment 4.2 is furthermore provided with a recess 6 which, during normal use, is covered by a cushion part and a flap, but, when the need arises, permits an elongate item to be loaded through it. The recess 6 is arranged approximately centrally in the backrest 1, as viewed in the transverse direction Y of the vehicle, such that only a relatively narrow web 7 remains between the recess 6 and the separating region between the backrest segments 4.1 and 4.2. Of course, in the event of an accident-induced striking of the item against the backrest 1, said region is particularly subjected to a mechanical load.

As is apparent from FIG. 2, the structural element of the backrest segment 4.2, which structural element is shown there in the section A-A through the web 7, comprises a stamped sheet metal plate 8 which is provided on its outer circumference with an encircling, U-shaped channel 9.1 which is open toward the rear side of the backrest segment 4.2. During the manufacturing of the seat, the fastening profiles of the seat cover are fitted into the free limb 10 of said channel 9.1. The outer edge region of the backrest segment 4.2 is furthermore provided with an encircling, likewise stamped reinforcing plate 11 which engages around the channel 9.1 and is welded to the sheet metal plate 8 with a hollow chamber 16.1 being formed.

According to the invention, the channel 9.1 is designed such that it is significantly wider, at least in the region of the web 7, but preferably over its entire extent, than would be necessary to fit the seat cover fastening elements in. A reinforcing profile 12 bent in a Z-shaped manner can therefore be inserted into that region of the channel 9.1 which faces away from the free limb 10, the base 13 of which reinforcing profile runs parallel to the free limb 10 and which is welded with its limb 14.1 in the channel base 15 and with its limb 14.2 on the other side of the channel 9.1 to the sheet metal plate 8, with formation of a further hollow chamber 16.2 and a U-shaped channel 9.2 which remains on the edge side.

The invention has the greatest effect in the web 7 which is subjected to a particularly high load, but, with a reinforcing profile 12 partially or even entirely encircling the outer circumference of the backrest segment, can also considerably stiffen the backrest segment 4.2 overall. Of course, the backrest segment 4.1 or the structural element of an undivided backrest or else the structural element of seat parts may also be designed in accordance with the invention. If the need arises, the reinforcing profile 12 may be composed, for example, of profiled parts formed by rolling or else of a sheet metal semifinished product stamped in a Z-shaped manner.

REFERENCE NUMERALS

1 Backrest
2 Seat part
3 Rear seat bench
4.1, 4.2 Backrest segment
5.1, 5.2 Seat part segment
6 Recess
7 Web
8 Sheet metal plate
9.1, 9.2 Channel
10 Limb (of the channel 9.1)
11 Reinforcing plate
12 Reinforcing profile
13 Base
14.1, 14.2 Limb (of the reinforcing profile 12)

15 Channel base
16.1, 16.2 Hollow chamber

The invention claimed is:

1. A structural element for a vehicle seat, comprising:
a sheet metal plate including a U-shaped channel formed at least in partial regions of the sheet metal plate circumference;
a reinforcing plate disposed onto the sheet metal plate, and forming a first hollow chamber adjacent to the U-shaped channel between the sheet metal plate and the reinforcing plate; and
a reinforcing profile inserted into an opening in the U-shaped channel outside of the first hollow chamber to divide the U-shaped channel into at least one second hollow chamber and at least one remaining channel.

2. The structural element as claimed in claim 1, wherein the at least one remaining channel is U-shaped and/or is arranged in an outermost edge region of the structural element.

3. The structural element as claimed in claim 1, wherein the reinforcing profile is of Z-shaped design.

4. The structural element as claimed in claim 3, comprising a first limb of the reinforcing profile is connected in a channel base of the channel, and a second limb of the reinforcing profile is connected to the sheet metal plate and/or to the reinforcing plate on the other side of the channel.

5. The structural element of claim 1, wherein the U-shaped channel is formed by a stamping process.

6. The structural element of claim 1, wherein the reinforcing plate is formed by a stamping process.

7. A structural element for a vehicle seat, comprising:
a backrest support plate including a U-shaped channel extending along at least a portion of a circumference of the backrest support plate; and
a reinforcing profile inserted within an opening of the U-shaped channel to divide the U-shaped channel into at least one hollow chamber and at least one remaining channel, wherein the reinforcing profile is substantially Z-shaped, and includes a first limb coupled to the backrest support plate within the U-shaped channel, and a second limb coupled to the backrest support plate outside of the U-shaped channel.

8. The structural element of claim 7, wherein the first limb and the second limb are coupled to the backrest support plate by a respective welded connection.

9. The structural element of claim 7, comprising a reinforcing plate coupled to the backrest support plate, and forming a second hollow chamber adjacent to the U-shaped channel.

10. The structural element of claim 9, wherein the reinforcing plate is coupled to the backrest support plate at a first point and a second point by a respective welded connection.

11. The structural element of claim 9, wherein the reinforcing plate comprises a stamped sheet metal plate.

12. The structural element of claim 7, wherein the reinforcing profile comprises a stamped sheet metal plate.

13. The structural element of claim 7, wherein the backrest support plate comprises a stamped sheet metal plate.

14. A structural element for a vehicle seat, comprising:
a backrest support plate including a U-shaped channel extending along at least a portion of a circumference of the backrest support plate;
a reinforcing plate coupled to the backrest support plate, and forming a hollow chamber adjacent to the U-shaped channel between the backrest support plate and the reinforcing plate; and
a reinforcing profile disposed within the U-shaped channel outside of the hollow chamber to divide the U-shaped channel into at least one second hollow chamber and at least one remaining channel, wherein the reinforcing profile is substantially Z-shaped, and includes a first limb coupled to the backrest support plate within the U-shaped channel, and a second limb coupled to the backrest support plate outside of the U-shaped channel.

15. The structural element of claim 14, wherein the reinforcing plate is coupled to the backrest support plate at a first point and a second point by a respective welded connection.

16. The structural element of claim 14, wherein the first limb and the second limb are coupled to the backrest support plate by a respective welded connection.

17. The structural element of claim 14, wherein the at least one remaining channel is substantially U-shaped.

* * * * *